United States Patent

[11] 3,591,833

[72] Inventor John F. Bolinger
Michigan, Ind.
[21] Appl. No. 822,834
[22] Filed Apr. 10, 1969
[45] Patented July 6, 1971
[73] Assignee Meridian Industries, Inc.

[54] PROTECTIVE MEANS FOR TRANSISTORIZED LOAD CIRCUIT
12 Claims, 3 Drawing Figs.

[52] U.S. Cl. 317/33, 340/331
[51] Int. Cl. H05b 39/00
[50] Field of Search 307/92, 94; 340/331; 317/33

[56] References Cited
UNITED STATES PATENTS

| | | | |
|---|---|---|---|
| 2,891,195 | 6/1959 | Smyth | 315/159 |
| 3,188,623 | 6/1965 | Culbertson | 340/331 |
| 3,311,787 | 3/1967 | Gunderman | 317/33 |

*Primary Examiner*—J. D. Miller
*Assistant Examiner*—Harry E. Moose, Jr.
*Attorney*—Dale A. Winnie

ABSTRACT: A transistorized switching circuit for flashers which includes a load switching transistor that is "turned off" in the event of a short in the load circuit. The switching transistor has associated first semiconductor means for controlling current flow and additional semiconductor means, generally in parallel with the first semiconductor means, for preventing the first semiconductor becoming conductive whenever a short occurs in the load circuit.

JOHN F. BOLINGER
INVENTOR

BY Dale A. Winnie
ATTORNEY

JOHN F. BOLINGER
INVENTOR

BY Dale A. Winnie
ATTORNEY

PROTECTIVE MEANS FOR TRANSISTORIZED LOAD CIRCUIT

BACKGROUND OF THE INVENTION

In many solid-state switching circuits, for flashers and the like, there is a great deal of concern about the adverse effects of shorts in the load circuits. This concern may be because the switching circuit is in an environment which is susceptible to the accumulation of explosive vapors, such as gasoline fumes, or because the power or load transistor may not be capable of sustaining abnormally higher current levels, such as occur during short circuit operation, without experiencing damage. In situations like these, it can be seen that continued cyclic operation of the power or load transistor during the short circuit conditions may result in substantial damage not only to the flasher circuit itself, but also to the environmental structure.

SUMMARY OF THE INVENTION

An electric circuit, in an embodiment of this invention, comprises a power transistor, a load circuit, electrical signal generating means for producing and applying an electrical signal to bias the power transistor into conduction, and means sensitive to an abnormally high current flow through the load circuit to prevent the creation and application of a bias to the power transistor and thereby render the power transistor nonconductive.

Accordingly, a general object of this invention is to provide circuit means for protecting the power or load switching transistor of a transistorized flasher circuit from the effects of short circuits or similar disturbances in the load circuit.

Another object of the invention is to provide a transistorized flasher in which the power or load switching transistor is rendered automatically nonconductive in the event of a short circuit or the like in the load circuit.

A further object of the invention is to provide means, within the circuit set forth above, which renders the flasher circuit operative immediately upon correction of a short without the need of an intermediate step to reset the circuitry.

Other more specific objects and advantages of the invention will become apparent upon reference to the following detailed description considered in conjunction with the accompanying drawings.

DETAILED DESCRIPTION OF THE ILLUSTRATED EMBODIMENTS

The present invention is not limited in its application to the details of construction or arrangement of parts shown in the accompanying drawings, since it is capable of other embodiments and of being practiced or carried out in various ways, and it is to be understood that the phraseology and terminology employed herein are merely for the purpose of description and not of limitation.

Figure 1:
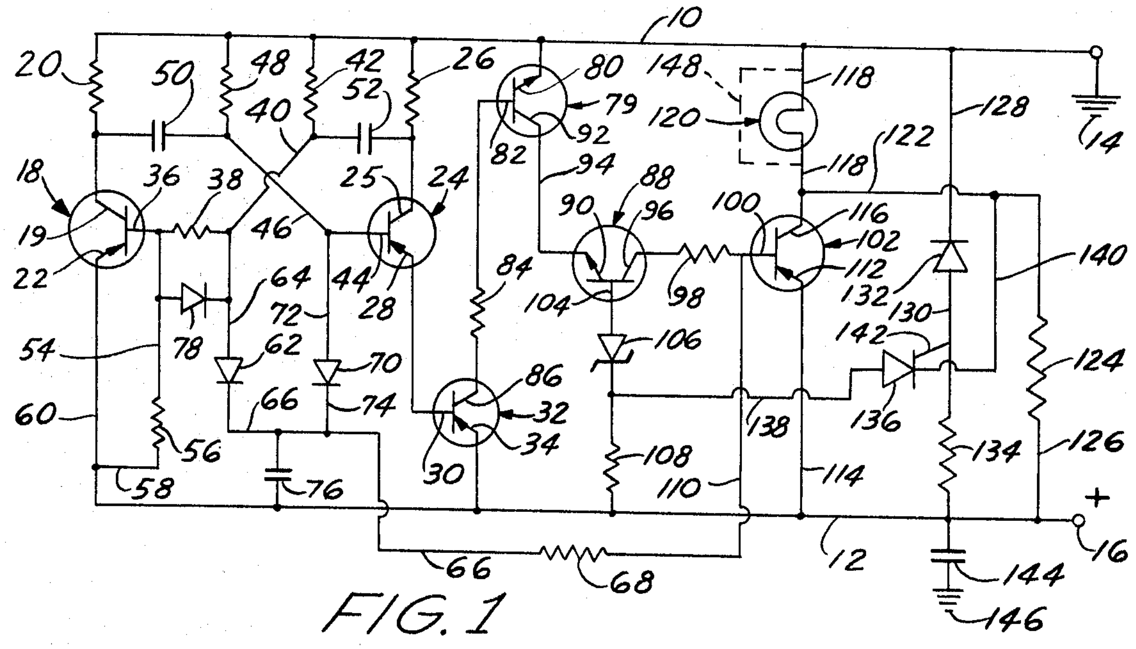
FIG. 1 is a wiring diagram illustrating one embodiment of the invention.

Referring now in greater detail to the drawings, and in particular to FIG. 1 which illustrates a preferred embodiment of this invention:

Conductors 10 and 12 are respectively connected to ground, as at 14, and to a positive voltage source as at a terminal 16.

A first transistor 18 has its collector electrode 19 connected in series through a resistor 20 to the conductor 10 and its emitter electrode 22 connected to conductor 12.

A second transistor 24 similarly has its collector electrode 25 connected in series with a resistor 26 to conductor 10. However, its emitter electrode 28 is connected to the base electrode 30 of a third transistor 32 and through the emitter electrode 34 thereof to the conductor 12.

The base electrode 36 of transistor 18 is connected in series with a resistor 38 which is connected to a conductor 40 that communicates with conductor 10 through a resistor 42. Similarly, base electrode 44 of transistor 24 communicates with conductor 10 through a conductor 46 and a resistor 48.

A first capacitor 50 has one end or side connected between resistor 20 and collector electrode 19 and its other end or side connected to conductor 46. A second capacitor 52 similarly has one side connected between the collector electrode 25 of transistor 24 and the resistor 26, and has its other side connected to conductor 40.

A conductor 54 is connected at one end to a point between base electrode 36 and resistor 38. The other end of conductor 54 is connected to a resistor 56 which is connected by a conductor 58 to the conductor 60 that connects emitter electrode 22 to conductor 12. Resistor 56 is thereby placed in parallel with the emitter-base circuit of transistor 18.

A first diode 62 is electrically connected at its anode by a conductor 64 to conductor 40. Diode 62 is connected at its cathode to a conductor 66. Resistor 68 serially connects to diode 62 through conductor 66.

A second diode 70 is connected at its anode by a conductor 72, to conductor 46. Conductor 46 connects resistor 48 and base electrode 44. Diode 70 is connected at its cathode to conductor 66 by means of a conductor 74.

A capacitor 76 has one side electrically connected to conductor 66 at a point between diodes 62 and 70. The other side of capacitor 76 is connected to main conductor 12. A third diode 78 has its anode and cathode respectively connected to conductors 54 and 64 thereby being placed in parallel with resistor 38.

A fourth transistor 79 has its emitter electrode 80 connected to main conductor 10. Its base electrode 82 is connected in series with a resistor 84 and collector electrode 86 of transistor 32. Transistor 79 is an NPN type.

A fifth transistor 88 is an NPN transistor. Transistors 18, 24, and 32, previously described, are of the PNP type. Transistor 88 has its emitter electrode 90 in series circuit with the collector electrode 92 of transistor 79 through a conductor 94. Transistor 88 has its collector electrode 96 in series with a resistor 98 and base electrode 100 of a power or load transistor 102. Transistor 88 has its base electrode 104 electrically connected to main conductor 12 by means of serially arranged zener diode 106 and resistor 108. Resistor 68 is also electrically connected, by a conductor 110, to the base electrode 100 of transistor 102 at a point generally between the base 100 and resistor 98. Emitter electrode 112 of power transistor 102 is connected by a conductor 114 to main conductor 12. Power transistor 102 has its collector electrode 116 connected to a circuit branch 118. Branch 118 has a load (such as a lamp bulb) 120 serially connected therewith, leading to main conductor 10.

A conductor 122 is electrically connected at one end to branch 118 at a point between collector electrode 116 and load 120. Conductor 122 is connected at its other end to a resistor 124. This resistor is connected by a conductor 126 to main conductor 12.

Another branch circuit, generally parallel to the emitter-collector circuit of transistor 102, is electrically connected across main conductors 10 and 12. This branch is comprised of conductor portions 128, 130, serially connected diode 132, and serially connected resistor 134.

A silicon control rectifier (SCR) 136 has its anode communicated by a conductor 138 to the base circuit of transistor 88 at a point generally between the zener diode 106 and resistor 108. The cathode of SCR 136 is connected by conductor 140 to conductor 122 and its gate electrode 142 is connected by conductor 130 between the diode 132 and resistor 134.

A capacitor 144 may be connected to main conductor 12 and to ground, as at 146, as is shown.

Each of transistors 18, 24, 32 and 102 are of the PNP type while transistors 79 and 88 are of the NPN type. Characteristically, during normal conduction, in the PNP type, the emitter will be positive with respect to both the collector and base while the collector is negative with respect to both the emitter and base. In the NPN type, normal conduction is achieved when the emitter is negative with respect to both the collector and base while the collector is positive with respect to both emitter and base.

Transistors 18 and 24 comprise a multivibrator, the operation of which is reviewed as follows. When transistor 18 has just switched on, creating current flow through the emitter-collector circuit 22, 19, and that transistor 24 has switched off to its nonconducting state, capacitor 50 is fully charged. At this time capacitor 52 will be discharged.

Capacitor 50 now starts charging toward the opposite polarity by virtue of being essentially connected to main conductor 12 while transistor 18 is conducting. It can also be seen that because of the charge existing on capacitor 50 at the instant that transistor 18 went into conduction and its connection to base electrode 44 of transistor 24, via conductor 46, the emitter-base electrodes of transistor 24 are reverse biased (the base being positive with respect to emitter 28) thereby keeping transistor 24 in an off or nonconductive state. At this same time, capacitor 52 will start to charge essentially through the emitter-base circuit of transistor 18, diode 78 and resistor 26. This charging current biases transistor 18 to remain conductive. Even when charging of capacitor 52 is completed, the transistor 18 will remain conductive by virtue of the base current provided through resistor 42.

As the potential across capacitor 50, holding transistor 24 off, is reduced, a condition is finally attained where the capacitor voltage can no longer maintain transistor 24 in the nonconductive state. As transistor 24 starts to become conductive, by virtue of a passing current through resistor 48, the collector to emitter voltage thereof drops and charged capacitor 52 now starts to discharge through resistor 42 resulting in a reverse bias rendering transistor 18 into nonconduction.

When transistor 18 is thusly driven into nonconduction, the voltage across its emitter 22 and collector 19 increases causing capacitor 50 to again start charging through the emitter-base circuit of conductive transistor 24. Such emitter-base current flow serves to further bias transistor 24 in the conduction state.

In this new state (transistor 24 being conductive) capacitor 52 starts to charge toward the opposite polarity by virtue of being connected to main conductor 12 through conducting transistor 24. The polarity on capacitor 52, during this time, produces a reverse bias on transistor 18. Diode 78 is now nonconductive. The purpose of resistors 38 and 56 and diode 78 is to divide the discharge voltage from capacitor 52 below the breakdown voltage of transistor 18. While capacitor 52 is charging, diode 78 is forward biased placing an effective short across resistor 38 to prevent resistor 38 from affecting the charging time of capacitor 52.

During the time that transistor 24 is conducting, capacitor 50 is being charged so that its end connected to resistor 48 will be positive with respect to the end connected to resistor 20. Such charging of capacitor 50 results from the base current from transistor 24. Transistor 24 is maintained conductive for some period after capacitor 50 has been fully charged because of the base bias provided by resistor 48.

As capacitor 52 continues to discharge and the voltage thereacross approaches zero, the voltage holding transistor 18 in a nonconductive state decreases and transistor 18 starts to again become conductive. This initiates the regenerative cycle which results in the rapid "turn on" of transistor 18 and "turn off" of transistor 24 as well as the subsequent rapid "turn off" of transistor 18 and "turn on" of transistor 24.

It can be seen that when transistor 24 is in a conductive state, the emitter-base circuit of transistor 32 is biased into conduction. This energizes the circuit through the emitter 34 and collector 86 of transistor 32. This causes base 82 of NPN transistor 79 to be positive with respect to emitter 80 thereby placing transistor 79 in conduction. As a consequence of transistor 79 being turned on, emitter 90 of NPN switching transistor 88 is made negative with respect to base 104. This energizes the circuit through the emitter-collector of transistor 88. This biases the base 100 of PNP transistor 102 negative with respect to its emitter 112. The emitter-collector circuit of transistor 102 is thereby made conductive resulting in the load circuit 118 and load 120 being energized.

While switching transistor 88 is in its normal conductive state, current will flow through resistor 108 and zener diode 106 to base 104 of transistor 88.

As can be seen from the preceding, power or load transistor 102 is made conductive during the period that multivibrator transistor 24 is conductive. When multivibrator transistor 24 is cyclically rendered nonconductive, as previously described, transistors 32 and 79 are also rendered nonconductive causing load transistor 102 to be nonconductive thereby deenergizing load 120.

When a short has occurred in either the load 120 or the load circuit 118, as diagrammatically illustrated in dotted line at 148, while power transistor 102 is in its conductive state, the cathode of SCR 136 is connected to ground potential by virtue of the short circuit 148 and conductors 122, 140.

It will be noted that the cathode of diode 132 is always connected to ground potential by conductor 128. Consequently, the potential existing, at this time, across diode 132 and the potential across the gate to the cathode of SCR 136 are equal to each other. This causes the SCR 136 to become conductive. This energizes a circuit through conductors 138 and 140.

Since conductor 138 is connected at its other end to a point between zener diode 106 and resistor 108, the voltage drop across zener diode 106 is reduced to a value below its breakdown voltage. This causes zener diode 106 to become nonconductive. Consequently, the forward bias on switching transistor 88 is removed. This results in both switching transistor 88 and power transistor 102 being "turned off" or nonconductive.

In this preferred embodiment, resistor 134 provides a limited bias current to diode 132. Resistor 124 is employed to produce a voltage drop when power transistor 102 is "turned off" or in its nonconductive state. If resistor 124 were not included, it can be seen that when power transistor 102 was "-turned off" by the normal operation of the multivibrator, the collector 116 would be essentially at ground potential. This would result in having the gate-to-cathode potential substantially equal to the potential across diode 132 which is sufficient to cause SCR 136 to go into conduction. Therefore, by producing a minimal current flow through the load 120 (not sufficient to fully energize the load 120) a relatively small voltage drop or potential is created across the load 120 with the collector side of the load 120 being positive. This relatively small voltage drop effectively substracts from the potential which would exist across the gate-cathode terminals of SCR 136 had the cathode been brought to ground potential. Accordingly, the resulting potential across the gate-to-cathode terminals of SCR 136 is less than the required gate triggering voltage necessary to place SCR 136 in conduction.

In view of the above, it can be stated that resistor 124 is provided in order to produce a minimal current flow through the load 120 (during the time that power transistor 102 is turned off by the multivibrator) in order to create a relatively small voltage drop thereacross which, in turn, causes the gate-to-cathode terminals of SCR 136 to experience a voltage potential of a value less than the required gate triggering voltage thereby precluding conduction through SCR 136.

It should, of course, be apparent that once SCR 136 is "-turned on" or made conductive it will remain conductive until such time as when the short circuit condition is corrected, and, of course, the power transistor 102 is held in its nonconductive state as long as SCR 136 is "turned on."

Preferrably, diodes 62, 70 and resistor 68 are provided between the respective bases of multivibrator transistors 18, 24 and power or load transistor 102 in order to provide additional protection for load transistor 102 against possible damaging reverse currents during both normal and short circuit operation.

Figure 2:
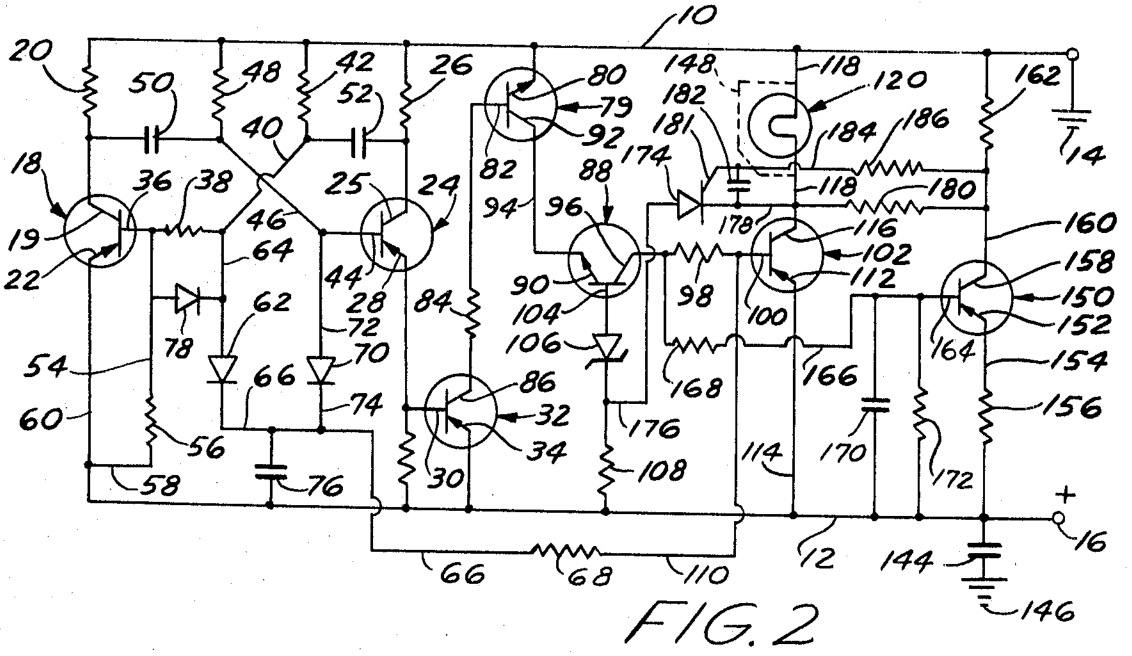
FIG. 2 is a wiring diagram illustrating a second embodiment of the invention.

Alternative Embodiment of FIG. 2

In the embodiment of FIG. 2 all elements which are both like and function in the same manner as those in FIG. 1 are identified with like reference numbers.

In addition to the elements described relative to FIG. 1, the embodiment of FIG. 2 includes an additional transistor 150. Its emitter electrode 152 is connected by a conductor 154 in series with resistor 156 to main conductor 12. Its collector electrode 158 is connected by a conductor 160 in series with resistor 162 to main conductor 10. The base electrode 164, of transistor 150, is connected, by a conductor 166 and resistor 168 in series therewith, to a point between resistor 98 and collector electrode 96 of transistor 88.

A capacitor 170 has one side thereof connected to main conductor 12 and the other side thereof connected to conductor 166 so as to be generally parallel to the emitter-base circuit of transistor 150. Also in parallel is a resistor 172 which has its opposite ends respectively connected to conductors 166 and 12.

A silicon control rectified (SCR) 174 has its anode connected by a conductor 176 to the base circuit of transistor 88 at a point between zener diode 106 and resistor 108. Its cathode is connected to conductor 118, at a point between load 120 and collector terminal 116, by a conductor 178. A resistor 180, has one end connected to the juncture of conductors 178 and 118. Its other end is connected to conductor 160.

The gate electrode 181 of SCR 174 is connected, by a conductor 184 and resistor 186, to conductor 160. A capacitor 182 is placed across the gate-cathode circuit of SCR 174.

When transistor 88 goes into conduction thereby "turning on" power transistor 102, as described with reference to FIG. 1, transistor 150, which has its base circuit communicating with the base circuit of load transistor 102, is also driven into conduction.

At this time power transistor 102 exhibits a very low voltage drop and the supply voltage appears essentially across the load 120. Similarly, transistor 150 has a very low voltage drop across its collector to emitter terminals. Thus the supply voltage is applied substantially across resistors 162 and 156 in series with it.

Preferably, the resistance values of resistors 156 and 162 are selected so that most of the voltage drop occurs across resistor 162. If, for example, it is assumed that a voltage drop of 1.0 volt exists across resistor 156 and that 11.0 volts exist across resistor 162, during normal operation (transistors 102 and 150 conducting and no short circuit) a drop of 1.0 volts would appear across resistor 180 with a polarity in a direction to keep the SCR 174 in a nonconducting state.

If, with transistors 102 and 150 conducting, a short circuit, as depicted at 148, should occur, the voltage drop across the load 120 goes to zero and consequently resistor 180 now experiences 11.0 volts thereacross with a polarity reversed from that previously experienced. This now causes SCR 174 to become conductive and remain conductive until the supply voltage is interrupted.

As in the embodiment of FIG. 1, when SCR 174 becomes conductive, the zener diode 106 in the base circuit of transistor 88 becomes nonconductive thereby rendering transistor 88 nonconductive which, in turn, causes power transistor 102 and transistor 150 to "turn off" and become nonconductive.

Capacitor 170 is provided in order to slightly delay the "-turn off" of transistor 150 during normal operation. This is done to assure the establishment of the load voltage drop before the creation of the voltage drop across resistor 162. This prevents the accidental "turn on" of the SCR 174 during normal operation.

ALTERNATIVE EMBODIMENT OF FIG. 3

Figure 3:
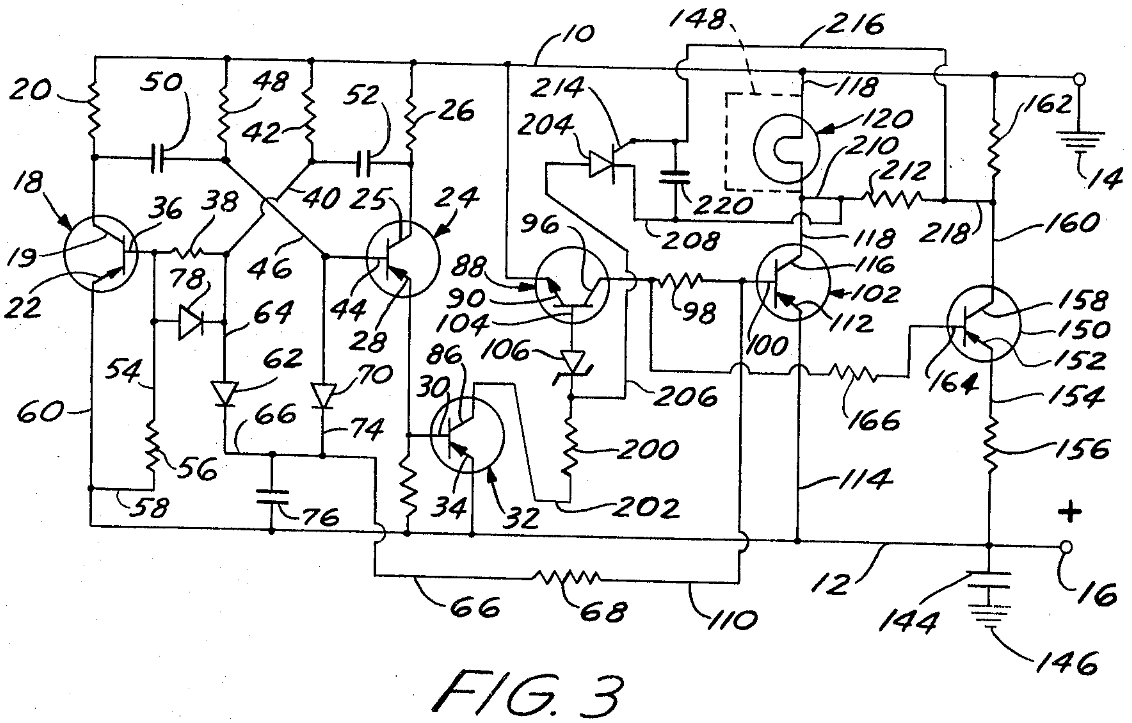
FIG. 3 is a wiring diagram illustrating a third embodiment of the invention.

In the embodiment of FIG. 3, all elements which are both like and function in the same manner as those in FIG. 2 are identified with like reference numbers.

Accordingly, in addition to those common elements described relative to FIG. 2, the embodiment of FIG. 3 includes a resistor 200. One end is connected to zener diode 106 and its other end connected to the collector electrode 86 of transistor 32 by means of a conductor 202.

A silicon control rectifier (SCR) 204 has its anode terminal connected, by a conductor 206, to the base circuit of transistor 88 at a point between the zener diode 106 and resistor 200. The cathode terminal of SCR 204 is connected, by a conductor 208, to a conductor 210. Conductor 210 connects one end of a resistor 212 to the load circuit conductor 118. The gate electrode 214 is connected, by a conductor 216, to a conductor 218. Conductor 218 connects the other end of resistor 212 to conductor 160 intermediate resistor 162 and collector electrode 158 of transistor 150.

A capacitor 220 has one side connected to conductor 216. Its other side connects to conductor 208. Capacitor 220 functions like capacitor 182 of FIG. 2.

In the embodiment of FIG. 3, the base current for transistor 88 is supplied through the emitter-collector circuit of transistor 32. Accordingly, when transistor 32 becomes conductive (in a manner described with reference to FIG. 1) the collector terminal 86 is essentially at the potential of main conductor 12 causing transistors 88, 102 and 150 to become conductive. At this time, with no short circuit present, a voltage drop across resistor 212 is experienced; however, the polarity is opposite to that which is required to make the SCR 204 conductive.

In comparison it can be seen that if a short is present at this time the polarity will become reversed across resistor 212 causing the gate to be positive with respect to the cathode thereby causing SCR 204 to become conductive. As in the embodiment of FIG. 2, when SCR 204 becomes conductive a sufficient voltage drop occurs across resistor 200 reducing the voltage available across zener diode 106 to a point where zener diode 106 no longer conducts. Therefore, at this point, transistors 96, 102 and 150 become nonconductive.

The embodiment of FIG. 3 differs from that of FIG. 2 by having the SCR 204 operate cyclically with the multivibrator and transistor 32. That is, even if a short is present, when transistor 32 is rendered nonconductive, SCR 204 also becomes nonconductive. Therefore, when the transistor 32 is again turned on by the multivibrator the SCR 204 will again turn on if the short still exists. The advantage of this arrangement is that it is self-resetting. That is, when the short circuit is corrected, the SCR 204 will simply not go into conduction and transistors 102 and 150 will operate normally.

Although only a select number of embodiments of the invention have been disclosed and described it is apparent that other embodiments and modifications of the invention are possible within the scope of the appended claims.

I claim:

1. In a flasher circuit of the type adapted to intermittently energize a load device from a voltage source and including an oscillator for producing an intermittent control signal, a switching device adapted to be switched between on and off conditions in response to said intermittent control signal to connect and disconnect the load device and the voltage source, the improvement comprising amplifying means having an input operatively connected with said oscillator and an output connected with said switching device for switching it from one condition to another in response to said intermittent control signal, voltage responsive means having an input adapted to be connected across the load device and an output connected to the input of said amplifying means, said voltage responsive means being adapted to change from a first conductive state to a second conductive state when the voltage across the input thereof decreases below a predetermined value, said voltage responsive means being effective in said second conductive state to disable said amplifying means whereby said switching device is turned off when said load device is substantially short circuited.

2. The invention as defined in claim 1 including means connected with the input of the amplifying means for inhibiting operation of said amplifying means while the voltage across the load device is below said predetermined value.

3. The invention as defined in claim 1 including reference voltage means connected with the input of the voltage responsive means whereby said predetermined value of voltage is established.

4. The invention as defined in claim 1 including bias means for maintaining the voltage across the load device above said predetermined value when said intermittent control signal causes the switching device to turn off in the absence of a short circuit across the load device.

5. The invention as defined in claim 1 wherein said voltage responsive means is operatively connected with said oscillator and is adapted to change from said second conductive state to said first conductive state upon removal of a short circuit across said load device and thereby restore switching control to said intermittent control signal.

6. A flasher circuit for use with an automotive vehicle and adapted to intermittently energize selected lamps of the vehicle from a battery and comprising a free-running oscillator for producing an intermittent control signal, a switching device adapted to be switched between on and off conditions in response to said intermittent control signal to connect and disconnect the load device and said battery, amplifying means having an input operatively connected with the output of said oscillator and having an output connected with said switching device, voltage responsive means having an input adapted to be connected with the load device and an output connected to the input of said amplifying means, said voltage responsive means being effective to disable said amplifying means when the voltage across the input of the voltage responsive means is below a predetermined value, bias means connected with the input of said amplifying means to maintain said amplifying means disabled until the voltage across the load device exceeds a predetermined value, the output of said amplifying means being connected with said switching device to switch it off in the absence of a control signal being applied through said amplifying means to said switching device whereby a short circuit across said load device will reduce the voltage at the input of the voltage responsive means to a value below said predetermined value and will disable said amplifying means to thereby prevent said intermittent control signal from turning on said switching device for the duration of said short circuit.

7. The invention as defined in claim 6 wherein said switching device is a power transistor adapted to have its output connected with said lamps and wherein said amplifying means comprises a driver transistor having its output connected with the input of the power transistor, said voltage responsive means including a semiconductor switching device having an input and a common electrode connected with a reference voltage device and adapted to be connected in circuit with said load device, said semiconductor switching device having an output electrode and said common electrode connected in circuit with the input of said driver transistor.

8. The invention as defined in claim 7 wherein said semiconductor switching device is operatively connected with the output of said free-running oscillator and is adapted to change from a conductive state to a nonconductive state in the absence of said control signal whereby the voltage responsive means is operative to restore switching control to said oscillator upon removal of said short circuit.

9. The invention as defined in claim 6 wherein said amplifying means comprises a driver transistor, and said switching device comprises a power transistor and said voltage responsive means comprises a controlled rectifier, a zener diode connected in the input of said driver transistor, said silicon controlled rectifier having its anode and cathode connected between said zener diode and said load device and having its gate electrode connected to a reference voltage device whereby said controlled rectifier becomes conductive when the voltage across the load decreases below said predetermined value and said zener diode blocks input current to said first transistor when the voltage across the load device is below said predetermined value.

10. The invention as defined in claim 7 wherein said semiconductor switching device is a controlled rectifier and said reference voltage device is a voltage reference transistor having an output adapted to be connected across the battery and an input connected with the output of said driver transistor, said controlled rectifier having its output electrodes connected between the input of said driver transistor and said load device, said controlled rectifier having its input electrodes connected between the input of said driver transistor and the output of said voltage reference transistor.

11. The invention as defined in claim 10 wherein a zener diode is connected in the input of said driver transistor.

12. The invention as defined in claim 10 including a switching transistor connected between the output of said oscillator and the input of said driver transistor whereby said controlled rectifier is switched off during alternate half-cycles of said oscillator and the load device is periodically tested for the removal of the short circuit.